United States Patent
Cho et al.

(10) Patent No.: US 11,822,114 B2
(45) Date of Patent: Nov. 21, 2023

(54) DISPLAY DEVICE AND OPTICAL COMPOSITE SHEET USED THEREIN

(71) Applicant: SK MICROWORKS SOLUTIONS CO., LTD., Cheonan-si (KR)

(72) Inventors: Kyoo Choong Cho, Seoul (KR); Tae Hoon Kim, Yongin-si (KR); Yong Jae Choe, Osan-si (KR); Jae Ho Ko, Osan-si (KR)

(73) Assignee: SK MICROWORKS SOLUTIONS CO., LTD., Cheonan-si (KR)

( * ) Notice: Subject to any disclaimer, the term of this patent is extended or adjusted under 35 U.S.C. 154(b) by 0 days.

(21) Appl. No.: 17/382,810

(22) Filed: Jul. 22, 2021

(65) Prior Publication Data

US 2022/0057565 A1 Feb. 24, 2022

(30) Foreign Application Priority Data

Aug. 20, 2020 (KR) .................. 10-2020-0104512

(51) Int. Cl.
*G02F 1/1335* (2006.01)
*F21V 8/00* (2006.01)
*G02F 1/13357* (2006.01)

(52) U.S. Cl.
CPC ......... *G02B 6/0053* (2013.01); *G02B 6/0051* (2013.01); *G02F 1/133606* (2013.01); *G02F 1/133607* (2021.01); *G02F 1/133536* (2013.01); *G02F 2201/08* (2013.01); *G02F 2201/086* (2013.01)

(58) Field of Classification Search
CPC ........ G02B 5/003; G02B 5/22; G02B 6/0053; G02B 6/0051; G02B 6/005; G02F 2201/08; G02F 1/133607; G02F 1/133606; G02F 1/133504; G02F 1/133507; G02F 1/133615
See application file for complete search history.

(56) References Cited

U.S. PATENT DOCUMENTS

| | | |
|---|---|---|
| 2005/0046321 A1 | 3/2005 | Suga et al. |
| 2016/0054486 A1 | 2/2016 | Isojima et al. |

(Continued)

FOREIGN PATENT DOCUMENTS

| | | |
|---|---|---|
| JP | 2016-46241 A | 4/2016 |
| JP | 2017-68250 A | 4/2017 |

(Continued)

OTHER PUBLICATIONS

English language translation of South Korean Patent Application No. KR10-2017/0133553; document downloaded from Espacenet at worldwide.espacenet.com on Mar. 23, 2023, and machine language translation into English provided by the Google Translate tool on the website. (Year: 2017).*

(Continued)

*Primary Examiner* — Angela K Davison
(74) *Attorney, Agent, or Firm* — Sughrue Mion, PLLC

(57) ABSTRACT

In the display device according to an embodiment, optical functional elements such as a prism sheet and a light diffusion layer are combined, and an optical composite sheet to which a light absorbing layer that selectively absorbs light of a specific wavelength band is inserted is used, so that the color gamut can be enhanced as compared with the prior art.

9 Claims, 8 Drawing Sheets

(56) References Cited

U.S. PATENT DOCUMENTS

2017/0059932 A1* 3/2017 Hong .................. G02B 6/0068
2017/0285248 A1* 10/2017 Cho .................. G02F 1/133528
2018/0252968 A1 9/2018 Nakamura et al.
2018/0275315 A1* 9/2018 Hsieh ...................... G02B 5/22

FOREIGN PATENT DOCUMENTS

| | | |
|---|---|---|
| JP | 2020-106781 A | 7/2020 |
| KR | 10-2012-0072194 A | 7/2012 |
| KR | 10-2017-0008655 A | 1/2017 |
| KR | 10-2017-0067011 A | 6/2017 |
| KR | 10-2017-0133553 | 12/2017 |
| WO | 2018/194019 A1 | 10/2018 |

OTHER PUBLICATIONS

Kenichiro Masaoka, "Single display gamut size metric", Journal of the SID, 2016, vol. 24, No. 7, pp. 419-423 (5 pages total).

* cited by examiner

A - A'

DISPLAY DEVICE AND OPTICAL COMPOSITE SHEET USED THEREIN

CROSS REFERENCE TO RELATED APPLICATIONS

This application claims priority and benefits from Korean Patent Application No. 10-2020-0104512 filed on Aug. 20, 2020, of which the content is incorporated by reference herein in its entirety.

TECHNICAL FIELD

Embodiments relate to a display device having an enhanced color gamut and to an optical composite sheet used for fabricating the same.

BACKGROUND ART

In the past, 40-inch (") TVs were the mainstream, but now a lot of consumers would buy 50" TVs and even 60" TVs. As such size competition has ended, the resolution competition has begun. A year ago, full high definition (FHD) TVs were a high-end model, but now ultra high definition (UHD) TVs have spread rapidly in the market.

Recently, the field of display devices is evolving from competition in the increased area and high resolution to competition in color. For this reason, competition for manufacturing a display device having excellent color has recently emerged.

A liquid crystal display (LCD) displays an image by using the optical properties of liquid crystal. Since a liquid crystal display panel that displays the image is a non-light-emitting device that does not emit light by itself, it has a structure comprising a liquid crystal display panel and a back-light unit that is disposed on the rear side thereof and supplies light to the liquid crystal display panel. A liquid crystal display device has advantages in that it is thinner and lighter in weight, consumes a low power, and requires a low driving voltage as compared with other display devices, whereas it is somewhat inferior to other display devices from the viewpoint of color.

In addition, cathode ray tube (CRT) display devices, which are disappearing now, have a color gamut of up to 80% based on the National Television Standards Committee (NTSC), and plasma display panel (PDP) devices having an NTSC level of 90% also have been marketed until recently. In addition, organic light-emitting display (OLED) devices, which are in the spotlight as a next-generation display device, can achieve an NTSC level of up to 100%. However, LCD TVs have an NTSC level of 72%.

Accordingly, in order to promote the market of the display device field, it is necessary to improve the disadvantages of liquid crystal display devices. In particular, there has been a demand for a technology to enhance the color gamut of conventional liquid crystal display devices.

REFERENCE DOCUMENT (Patent Document 1) Korean Laid-open Patent Publication No. 2012-0072194A

DISCLOSURE

Technical Problem

An optical sheet adopted in the backlight unit of a display device performs such functions as collecting, diffusing, and reflecting light. When two or more functions are combined, individual optical functions can be complemented and maximized. In addition, a filter function that blocks unnecessary wavelengths other than RGB may be combined with an optical sheet to enhance the color gamut.

As a result of research conducted by the present inventors, a display device having an enhanced color gamut as compared with the prior art has been developed by way of using an optical composite sheet in which a layer for selectively absorbing light of a specific wavelength band is inserted while optical functional elements such as a prism sheet and a light diffusion layer are combined.

Accordingly, an object of the embodiments is to provide a display device having an enhanced color gamut and an optical composite sheet used for fabricating the same.

Solution to Problem

According to an embodiment, there is provided a display device, which comprises a light source; a display panel that receives light incident from the light source to display an image; and an optical composite sheet disposed in an optical path from the light source to the display panel, wherein the optical composite sheet comprises a prism sheet disposed in the optical path; a light diffusion layer disposed in the light path; and a light absorbing layer disposed in the optical path and selectively absorbing light of a specific wavelength band among the light from the light source, and the DCI (Digital Cinema Initiatives) area ratio in the CIE 1931 chromaticity coordinates xy and the DCI overlapping ratio in the CIE 1976 chromaticity coordinates u'v' are both 90% or more.

According to another embodiment, there is provided an optical composite sheet, which comprises a prism sheet; a light diffusion layer disposed under the prism sheet; and a light absorbing layer disposed on or under the prism sheet and selectively absorbing light of a specific wavelength band, wherein the following Relationship (1) is satisfied:

$$1.5 \leq T\text{Peak2}/T\text{Peak1} \qquad (1)$$

In Equation (1), the first lowest color transmittance (TPeak1) is the lowest color transmittance in a first absorption wavelength band, wherein the first absorption wavelength band is a wavelength band from 575 nm to 615 nm, and the second lowest color transmittance (TPeak2) is the lowest color transmittance in a second absorption wavelength band, wherein the second absorption wavelength band is a wavelength band from 525 nm to 565 nm. A light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance is a value obtained by dividing L1 by L0.

Advantageous Effects

According to the embodiment, a display device having an enhanced color gamut as compared with the prior art can be provided by way of using an optical composite sheet in which a layer for selectively absorbing light of a specific wavelength band is inserted while optical functional elements such as a prism sheet and a light diffusion layer are combined.

EXPLANATION OF REFERENCE NUMERALS

Figure 1:
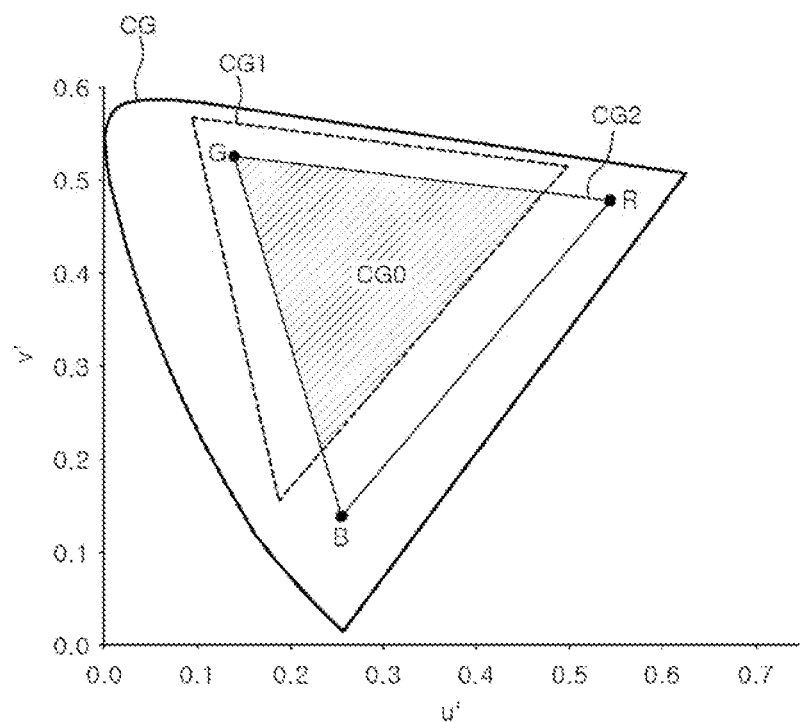
FIG. 1 shows a method of calculating a color gamut from CIE 1976 chromaticity coordinates u'v'.

1: display device
10: backlight unit
11: optical composite sheet (Example)
11': optical composite sheet (Comparative Example)
20: display panel
30: cover window
51: upper frame
52: lower frame
100: light absorbing layer
110: light absorber
120: binder resin
200: prism sheet
201: base layer
202: pattern layer
202a: first pattern
202b: second pattern
210: first prism sheet
220: second prism sheet
310: first light diffusion layer
311: bead
312: binder resin
320: second light diffusion layer
321: bead
322: binder resin
350: base film
400: reflective polarizing film
500: cushioning film
600, 610, 620, 630: adhesive layer
601: meniscus
700: light guide plate
800: reflector
M: laminate
S1, S2: skin layer
T1: thickness of a base layer
T2: thickness of a pattern layer
Ta: height of a first pattern
Tb: height of a second pattern
CG: full color gamut
CG0: overlapping color gamut
CG1: first color gamut
CG2: second color gamut
R: red
G: green
B: blue
a1: first absorption peak wavelength
a2: second absorption peak wavelength
b1: first absorption wavelength band
b2: second absorption wavelength band
APeak1: first absorption peak area
APeak2: second absorption peak area
TPeak1: first lowest color transmittance
TPeak2: second lowest color transmittance

BEST MODE

In the following description of the embodiments, in the case where an element is mentioned to be formed "on" or "under" another element, it means not only that one element is directly formed "on" or "under" another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

In the present specification, a singular expression is understood to encompass a singular or plural expression, interpreted in context, unless otherwise specified.

Display Device

The display device according to an embodiment comprises a light source, a display panel, and an optical composite sheet. The display panel receives light incident from the light source and displays an image. The optical composite sheet may be disposed in an optical path from the light source to the display panel. Thus, the display device may comprise a light source; an optical composite sheet on which light from the light source is incident; and a display panel on which light from the optical composite sheet is incident. As light from the light source passes through the optical composite sheet, its characteristics are enhanced, and the display panel displays an image using the light having the enhanced characteristics.

Figure 2:
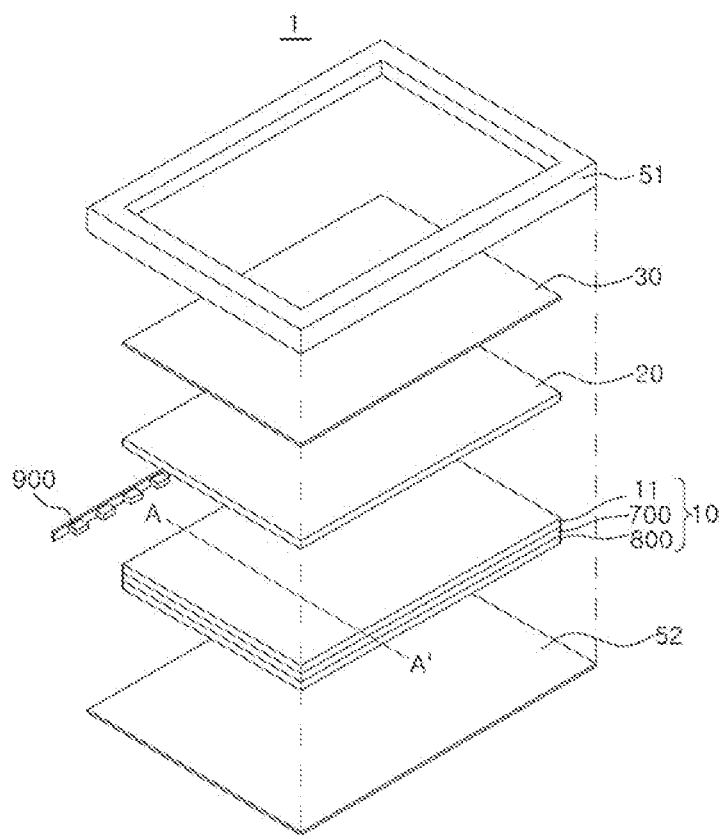
FIG. 2 shows an exploded perspective view of a display device according to an embodiment.

Specifically, referring to FIG. 2, the display device (1) may comprise a backlight unit (10); and a display panel (20) disposed on the backlight unit (10). The backlight unit (10) may comprise an optical composite sheet (11); and a diffusion plate or a light guide plate (700), and it may further comprise a light source (900).

The light source may be disposed on a lateral of the light guide plate or under the diffusion plate. The diffusion plate or light guide plate (700) is disposed under the optical composite sheet (11) and serves to transmit light generated from the light source (900) to the display panel (20). The light guide plate (700) is used in the case of an edge-type light source in which case a reflector (800) may be disposed under the light guide plate (700) to reduce light loss. The diffusion plate is used in the case of a direct light source, and an LED surface light source may be used to enhance light efficiency.

Referring to FIG. 2, light generated from the light source (900) is incident on a lateral of the light guide plate (700) and is reflected by the reflector (800) to enter the bottom of the optical composite sheet (11). The light incident in such a way passes through the optical composite sheet (11) vertically and is emitted from the top thereof. The light emitted from the top of the optical composite sheet (11) is incident on the display panel (20). As a result, an image may be displayed on the screen of the display panel.

The light source may be a white light source. For example, the light source may have a continuous emission spectrum. Specifically, the light source may be a white LED. More specifically, the light source may comprise a blue gallium nitride (GaN) light-emitting chip and a yellow yttrium aluminum garnet (YAG, $Y_3Al_5O_{12}$) phosphor. In addition, the light source may comprise a blue gallium nitride (GaN) light-emitting chip and an r, g phosphor or may comprise an r phosphor and a red KSF ($K_2SiF_6$:Mn) phosphor.

The display panel (20) may comprise a liquid crystal cell and one or more polarizing plates. As a specific example, the display panel (20) may have a structure in which a first polarizing plate, a liquid crystal cell, and a second polarizing plate are laminated in which an adhesive layer may be formed between the polarizing plates and the liquid crystal cell.

The display device (1) may further comprise a cover window (30) disposed on the display panel (20), and the cover window may be formed of a transparent polyimide film or ultra-thin glass (UTG). In addition, the display device (1) may further comprise an electrode and a substrate connected to the display panel (20). In addition, the display device (1) may comprise frames (51, 52) surrounding and protecting these components.

Constitutional Layers of the Optical Composite Sheet

The optical composite sheet comprises a prism sheet, a light diffusion layer, and a light absorbing layer. In addition, it may further comprise a base film, a reflective polarizing film, a cushioning film, and an adhesive layer.

The optical composite sheet may comprise a prism sheet; a light diffusion layer disposed under the prism sheet; and a light absorbing layer disposed on the prism sheet, between the prism sheet and the light diffusion layer, or under the light diffusion layer.

The prism sheet, the light diffusion layer, and the light absorbing layer may be disposed in an optical path from the light source to the display panel. The prism sheet, the light diffusion layer, and the light absorbing layer may be combined with each other. The light absorbing layer may be disposed closer to the light source than the prism sheet based on the light path. In addition, the light diffusion layer may be disposed closer to the light source than the light absorbing layer based on the light path.

Hereinafter, each constitutional layer will be described in detail.

Prism Sheet

The prism sheet serves to enhance luminance through collecting light by virtue of a difference in refractive index at the interface of the prism pattern.

Figure 6A:
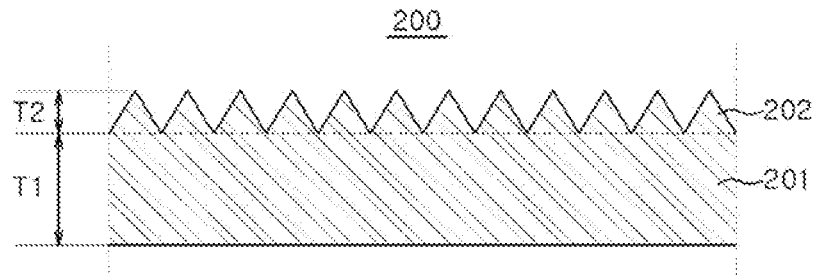
FIGS. 6a to 6c are cross-sectional views of a prism sheet employed in an optical composite sheet according to an embodiment.

Referring to FIG. 6a, the prism sheet (200) comprises a base layer (201) and a pattern layer (202) formed on the base layer. The pattern shape of the pattern layer is not particularly limited. For example, it may have a long triangular pillar shape, thereby refracting light at the interface.

Figure 6B:
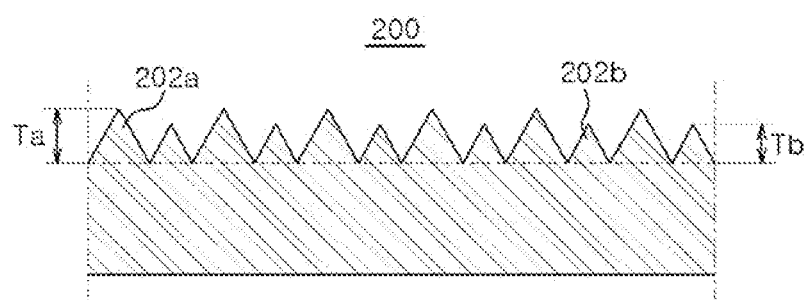

The prism sheet may comprise a plurality of prism patterns having different heights from each other. Referring to FIG. 6b, the prism pattern may be composed of a first pattern (202a) and a second pattern (202b) having different heights from each other.

The ratio (Tb/Ta) of the height (Tb) of the second pattern to the height (Ta) of the first pattern may be 0.5 to 0.99 or 0.8 to 0.95.

Figure 6C:
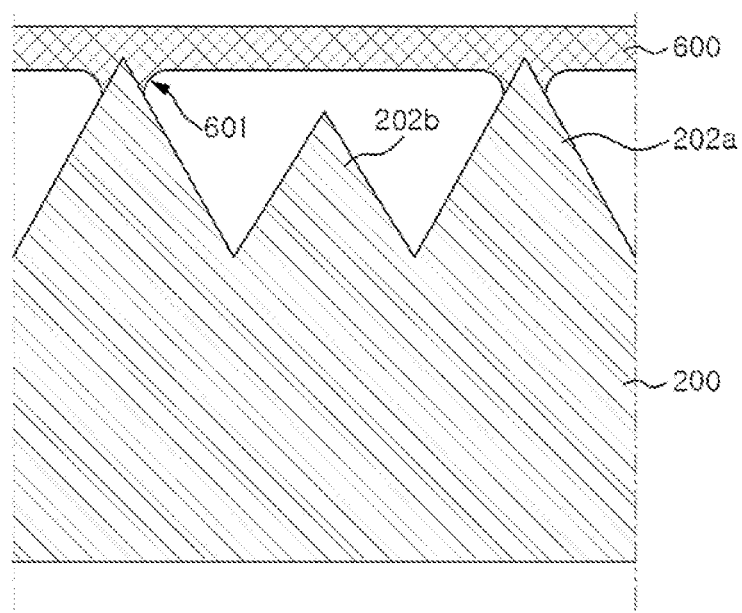

Referring to FIG. 6c, the vertex at the top end of the first pattern (202a) penetrates into an adhesive layer (600) and adheres thereto. In such a case, a meniscus (601) is formed, thereby deteriorating the light collecting performance. Thus, the height of the second pattern (202b) is made to differ from that of the first pattern to preserve the shape of the top end, whereby it is possible to suppress a deterioration in the light collecting performance.

The base layer and the pattern layer may be formed of the same material as each other. For example, the base layer and the pattern layer may be integrally prepared. Alternatively, the base layer and the pattern layer may be formed of different materials. For example, once a base layer has been prepared, a pattern layer may be formed thereon.

Specifically, examples of the material for the base layer include polyester resins, polyethersulfone resins, acrylic resins, polyetherimide resins, polyphenylene sulfide resins, polyarylate resins, polyimide resins, polycarbonate resins, cellulose triacetate resins, cellulose acetate propionate resins, and the like. More specifically, the material for the base layer may be a polyester resin, particularly, a polyethylene terephthalate resin or a polyethylene naphthalate resin.

In addition, the material for the pattern layer may be a UV-curable resin. Examples thereof include an acrylate resin such as an epoxy acrylate and a urethane acrylate, a methacrylate resin, and an epoxy resin.

Referring to FIG. 6a, the thickness (T1) of the base layer of the prism sheet may be 30 μm to 300 μm, specifically, 50 μm to 200 μm, and the thickness (T2) of the pattern layer may be 10 μm to 100 μm, specifically, 20 μm to 60 μm.

The optical composite sheet may comprise two or more prism sheets. Specifically, it may comprise a first prism sheet and a second prism sheet.

The first prism sheet and the second prism sheet may be the same as, or different from, each other in their patterns.

For example, the prism sheet may comprise a first prism sheet comprising a first prism pattern extending in a first direction; and a second prism sheet comprising a second prism pattern extending in a second direction that intersects with the first direction.

Specifically, the first prism sheet and the second prism sheet may be perpendicular to each other in the grain directions of their patterns. More specifically, the first prism sheet may be a horizontal prism sheet, and the second prism sheet may be a vertical prism sheet, or vice versa.

In addition, the pattern layer of the first prism sheet and the pattern layer of the second prism sheet may both face the same direction or may face different directions.

Light Diffusion Layer

The light diffusion layer may conceal the pattern of a prism sheet or the like by diffusing light. The optical composite sheet may further comprise one, two, or more light diffusion layers.

Figure 3:
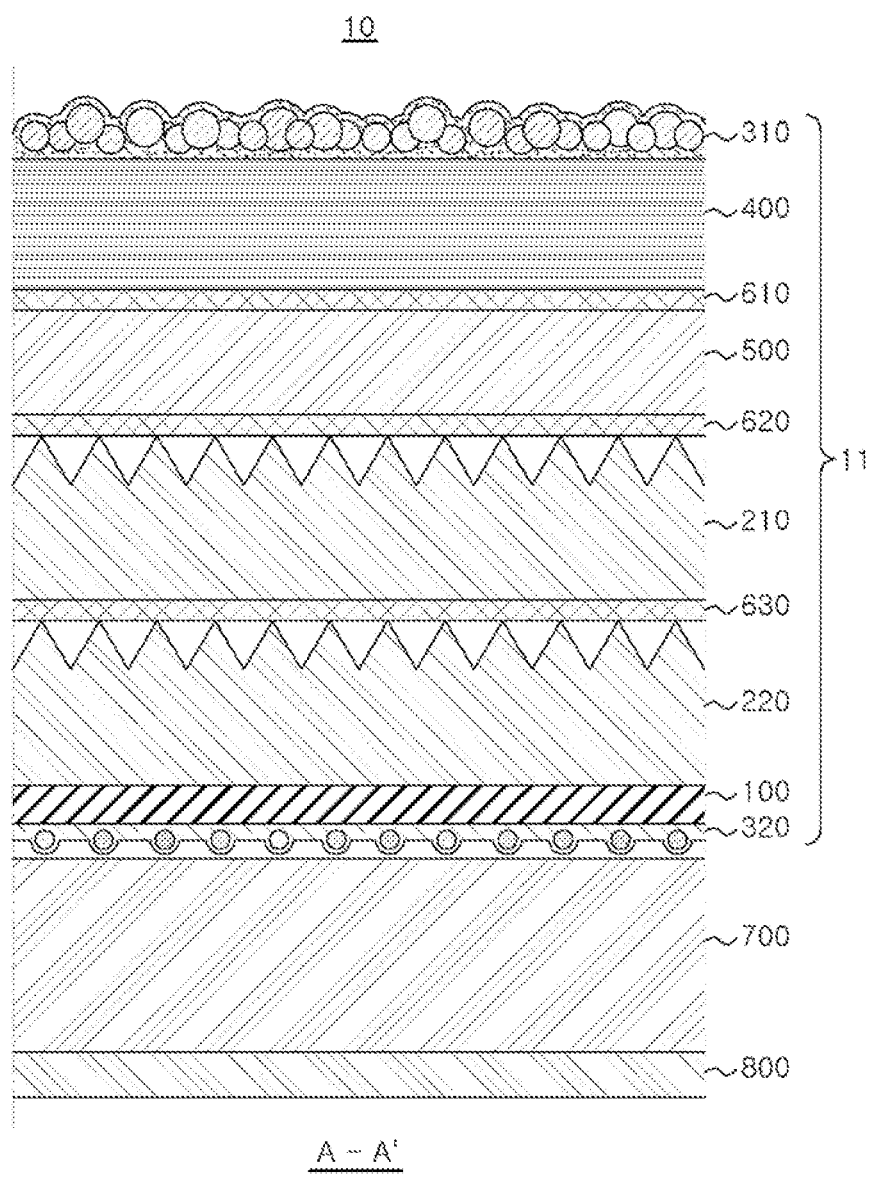
FIG. 3 shows a cross-sectional view of a backlight unit according to an embodiment.
Figure 8A:
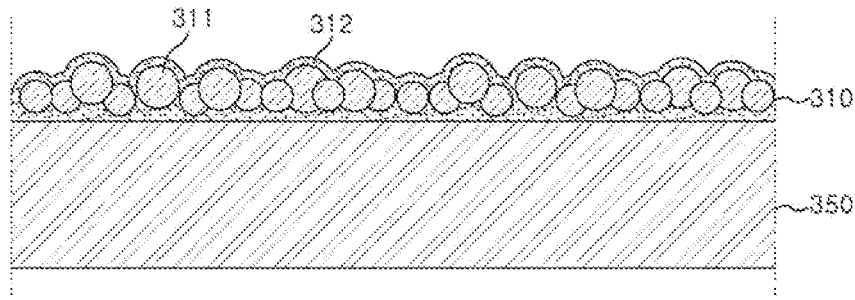
FIGS. 8a and 8b are cross-sectional views of a first light diffusion layer and a second light diffusion layer employed in an optical composite sheet according to an embodiment, respectively.
Figure 8B:
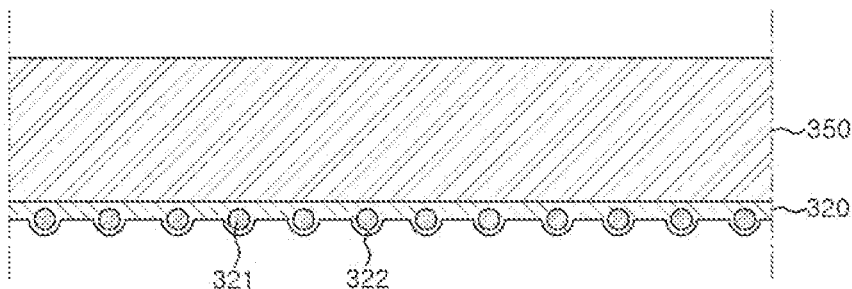

Referring to FIGS. 3, 8a, and 8b, the light diffusion layer may comprise a first light diffusion layer (310) and a second light diffusion layer (320) each having beads (311, 321) and a binder resin (312, 322). The first light diffusion layer (310) and the second light diffusion layer (320) may be formed in the lower part and in the upper part of the optical sheet, respectively.

The beads may be an organic bead. The specific material may be one or more selected from the group consisting of an acrylate-based resin, a polystyrene resin, a nylon resin, and a silicone resin. More specifically, it may be a hard acrylate-based resin. Although the shape of the beads is not particularly limited, it may be, for example, a spherical shape. In addition, it is advantageous from the viewpoint of concealing power, luminance, and prevention of grinding with an adjacent layer that the beads have an average particle diameter of 5 µm to 20 µm. More specifically, it may be 0.5 µm to 10 µm or 0.8 µm to 6 µm. The binder resin may be at least one of a thermosetting resin and a photocurable resin.

The first light diffusion layer may have a haze of 60% to 99%, more specifically, a haze of 60% to 98%. When the haze is within the above preferred ranges, there is an advantage of high luminance with sufficient concealing power.

The second light diffusion layer may have a haze of 3% to 30%, more specifically, a haze of 7% to 17%. When the haze is within the above preferred ranges, there is an advantage of high luminance with sufficient grinding prevention performance.

Light Absorbing Layer

The light absorbing layer selectively absorbs light of a specific wavelength band.

The light absorbing layer may have a main absorption wavelength within the visible light wavelength band. However, the main absorption wavelength of the light absorbing layer may belong to a band excluding the pure RGB wavelength within a visible light wavelength band. Accordingly, the light absorbing layer may enhance a color gamut by blocking unnecessary wavelengths other than the pure RGB wavelength emitted from the light source. For example, the main absorption wavelength of the light absorbing layer may fall within 470 nm to 520 nm or 550 nm to 620 nm. Specifically, the main absorption wavelength of the light absorbing layer may fall within 480 nm to 510 nm, 560 nm to 610 nm, or 580 nm to 620 nm.

In addition, the light absorbing layer may further have a supplementary absorption wavelength having a lower absorption rate than that of the main absorption wavelength. The supplementary absorption wavelength may also fall within a visible light wavelength band. For example, the supplementary absorption wavelength may also belong to a band excluding the pure RGB wavelength within a visible light wavelength band. Alternatively, the supplementary absorption wavelength may belong to a pure RGB wavelength band unlike the main absorption wavelength. For example, the supplementary absorption wavelength may belong to 510 nm to 560 nm or 530 nm to 570 nm.

As a specific example, the light absorbing layer may have a main absorption wavelength within 580 nm to 620 nm and a supplementary absorption wavelength within 530 nm to 570 nm. Within the above ranges, the color gamut can be enhanced more effectively.

Figure 7:
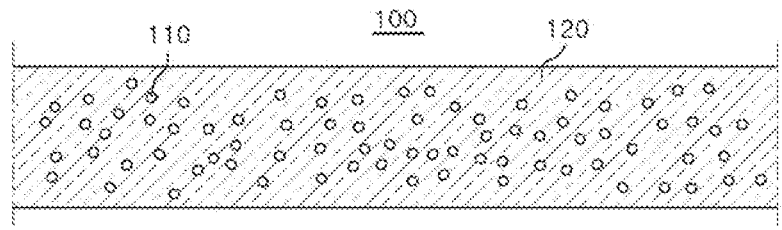
FIG. 7 is a cross-sectional view of a light absorbing layer employed in an optical composite sheet according to an embodiment.

FIG. 7 is a cross-sectional view of a light absorbing layer employed in an optical composite sheet according to an embodiment. Referring to FIG. 7, the light absorbing layer (100) may comprise at least one light absorber (110) and a binder resin (120).

The light absorber may have a main absorption wavelength as exemplified above. For example, the light absorber may be a dye or a pigment and an organic material or an inorganic material. Specifically, it may be an organic dye or an inorganic pigment.

As a specific example, the light absorber may be at least one selected from the group consisting of pyrrolemethines, rhodamines, borondipyrromethenes, tetraazaporphyrins, squarines, and cyanines.

The total content of the at least one light absorber may be 0.01% by weight to 10% by weight, specifically 0.05% by weight to 7% by weight, based on the weight of the light absorbing layer.

The binder resin may be composed of a component suitable for coating or adhesion. For example, it may be one or more selected from the group consisting of a polyester resin, an acrylic resin, a polyurethane resin, a melamine resin, an epoxy resin, a silicone resin, a polyvinyl alcohol resin, and an oxazoline resin.

The light absorbing layer may further comprise a UV blocking agent. Examples of the UV blocking agent include hydroxybenzotriazole-based, tris-resorcinol-triazine chromophore-based, and hydroxyphenyl-benzotriazole chromophore-based. It may be used alone or in combination of two or more. The content of the UV blocking agent may be 0.01% by weight to 10% by weight, specifically 0.05% by weight to 7% by weight, based on the weight of the light absorbing layer.

The light absorbing layer may have a light transmittance of at least a certain level. For example, the light absorbing layer may have a light transmittance of 30% or more, 45% or more, 50% or more, or 70% or more, specifically, 30% to 90% or 50% to 90%, for a wavelength of 590 nm.

Base Film

The optical composite sheet according to an embodiment may further comprise a base film to be coated with the light diffusion layer. That is, the light diffusion layer may be coated on the base film.

The material of the base film may be, for example, a polyester resin, specifically, a polyethylene terephthalate resin.

Reflective Polarizing Film

The optical composite sheet according to an embodiment may comprise a reflective polarizing film to enhance luminance. For example, the reflective polarizing film may be disposed on the prism sheet.

The reflective polarizing film refers to a film that produces a desired optical effect by a plurality of thin films laminated therein. Examples thereof include a double brightness enhancement film (DBEF).

Specifically, the reflective polarizing film may comprise two or more types of thin films having different optical properties from each other in a laminated form.

Figure 9:
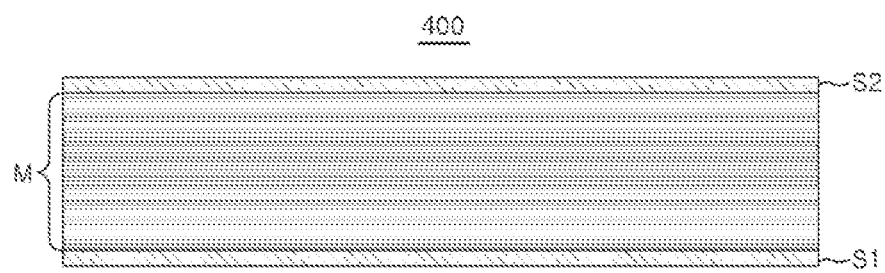
FIG. 9 is a cross-sectional view of a reflective polarizing film employed in an optical composite sheet according to an embodiment.

As shown in FIG. 9, the reflective polarizing film may have a laminate (M) of a plurality of thin films between two skin layers (S). In such event, the different optical properties of the thin films may be refractive index or retardation.

As a specific example, the reflective polarizing film may be one in which a first resin layer and a second resin layer having different optical properties from each other are alternately laminated in 100 to 2,000 layers.

Cushioning Film

The optical composite sheet may further comprise a cushioning film to protect the skin layer of the reflective polarizing film. Specifically, as shown in FIG. 3, when the prism sheet (210) is disposed under the reflective polarizing film (400), the pattern of the prism sheet (210) may affect the thin film of the reflective polarizing film, thereby deteriorating its performance. Accordingly, a cushioning film (500) may be interposed between the reflective polarizing film (400) and the prism sheet (210) to prevent the deterioration in performance.

The material of the cushioning film may be, for example, a polyester resin, specifically, a polyethylene terephthalate resin.

Adhesive Layer

The optical composite sheet may comprise an adhesive layer between its constituent elements (prism sheet, base film, reflective polarizing film, cushioning film, and the like).

Commonly used thermosetting resins and UV-curable resins may be used as the material of the adhesive layer. For example, acrylic-based, urethane-based, epoxy-based, vinyl-based, polyester-based, polyamide-based resins, or mixtures thereof may be used. Examples of the acrylic-based resin include homopolymers having a methyl methacrylic, methacrylic, ethylacrylic, butylacrylic, arylacrylic, hexylacrylic, isopropylmethacrylic, benzylacrylic, vinylacrylic, or 2-methoxyethylacrylic resin as a repeat unit or copolymers having two or more of the above components.

Preferred examples of the material of the adhesive layer include (meth)acrylate resins, unsaturated polyester resins, polyester (meth)acrylate resins, silicone urethane (meth)acrylate resins, silicone polyester (meth)acrylate resins, fluorine urethane (meth)acrylate resins, and mixtures thereof.

Thickness of Each Layer of the Optical Composite Sheet

The thickness of each constitutional layer of the optical composite sheet described above may be adjusted within a certain range.

The thickness of the prism sheet may be 50 μm or more or 80 μm or more, and 300 μm or less or 200 μm or less.

The thickness of the light diffusion layer may be 3 μm or more or 5 μm or more, and 30 μm or less or 20 μm or less.

The thickness of the light absorbing layer may be 1 μm or more, 2 μm or more, or 3 μm or more, and 100 μm or less, 25 μm or less, 15 μm or less, 10 μm or less, or 5 μm or less.

The thickness of the base film may be 50 μm or more or 70 μm or more, and 200 μm or less or 150 μm or less.

The thickness of the reflective polarizing film may be 50 μm or more or 70 μm or more, and 200 μm or less or 150 μm or less.

The thickness of the cushioning film may be 50 μm or more or 70 μm or more, and 200 μm or less or 150 μm or less.

As a specific example, the reflective polarizing film may have a thickness of 50 μm to 200 μm, the cushioning film may have a thickness of 50 μm to 200 μm, the prism sheet may have a thickness of 50 μm to 350 μm, the light diffusion layer may have a thickness of 3 μm to 30 μm, and the light absorbing layer may have a thickness of 1 μm to 100 μm.

Lamination Configuration of the Optical Composite Sheet

The constitutional layers of the optical composite sheet (prism sheet, light diffusion layer, light absorbing layer, reflective polarizing film, cushioning film, and the like) described above may be disposed in an optical path.

In addition, the constitutional layers of the optical composite sheet may be combined with each other. The combination may be a direct combination or an indirect combination through an adhesive layer or the like. Accordingly, the optical composite sheet may comprise a laminate in which the constitutional layers are directly or indirectly combined.

As an example, the light absorbing layer may be combined with at least one of the prism sheet and the light diffusion layer. Specifically, the light absorbing layer may be disposed on one side of at least one of the prism sheet and the light diffusion layer.

As another example, the prism sheet, the light diffusion layer, and the light absorbing layer may be combined with each other. Specifically, the prism sheet comprises a base layer and a pattern layer formed on one side of the base layer, a light absorbing layer is disposed on the other side of the base layer, and the light diffusion layer may be disposed on the surface of the light absorbing layer.

As another example, the reflective polarizing film, the prism sheet, the light diffusion layer, and the light absorbing layer may be directly or indirectly combined with each other.

The optical composite sheet may comprise a reflective polarizing film, a prism sheet disposed under the reflective polarizing film; a light diffusion layer disposed under the prism sheet; and a light absorbing layer disposed on one side of any one of the reflective polarizing film, the prism sheet, and the light diffusion layer.

In addition, the optical composite sheet may further comprise a reflective polarizing film disposed on the prism sheet; and an additional light diffusion layer disposed on the reflective polarizing film, wherein the reflective polarizing film may comprise two or more thin films having different optical properties from each other in a laminated form.

In addition, the optical composite sheet may further comprise a cushioning film between the reflective polarizing film and the prism sheet, wherein the reflective polarizing film, the cushioning film, the prism sheet, the light diffusion layer, and the light absorbing layer may be directly or indirectly combined with each other.

In addition, the optical composite sheet may further comprise a cushioning film disposed on the prism sheet, a reflective polarizing film disposed on the cushioning film; and an additional light diffusion layer disposed on the reflective polarizing film, wherein the reflective polarizing film may comprise two or more thin films having different optical properties from each other in a laminated form, and the cushioning film may comprise a polyester resin.

The position of the light absorbing layer (in particular, the position thereof relative to other constitutional layers) within the optical composite sheet may be adjusted to enhance the optical performance.

For example, the light absorbing layer may be disposed at a rear side of the prism sheet with respect to the front side from which light incident on the optical composite sheet is emitted. Specifically, the prism sheet comprises a first prism sheet and a second prism sheet, wherein the light absorbing layer may be disposed at a rear side of the first prism sheet or the second prism sheet with respect to the front side from which incident light is emitted.

In addition, the light absorbing layer may be formed between the first prism sheet and the second prism sheet. As a specific example, the prism sheet may comprise a first prism sheet comprising a first prism pattern extending in a first direction; and a second prism sheet comprising a second prism pattern extending in a second direction that intersects with the first direction, wherein the second prism sheet may be disposed under the first prism sheet, and the light absorbing layer may be disposed between the first prism sheet and the second prism sheet.

In addition, the second prism sheet may be disposed at a rear side of the first prism sheet with respect to the front side, the second prism sheet may comprise a base layer and a pattern layer formed on one side of the base layer, and the light absorbing layer may be formed on the other side of the base layer. Here, the light diffusion layer may be formed on the surface of the light absorbing layer.

Referring to FIGS. 2 and 3, light incident on the bottom of the optical composite sheet (11) is emitted from the top thereof, and the light absorbing layer (100) may be disposed under the prism sheets (210, 220). According to this arrangement, since light incident from a light source passes through the light absorbing layer before it passes through the entire prism sheet, the color deviation according to the viewing angle can be minimized.

Specifically, the prism sheet, the light diffusion layer, and the light absorbing layer may be combined with each other, the light absorbing layer may be disposed closer to the light source than the prism sheet based on the light path, and the light diffusion layer may be disposed closer to the light source than the light absorbing layer with based on the light path.

More specifically, the prism sheet may comprise a first prism sheet comprising a first prism pattern extending in a first direction; and a second prism sheet comprising a second prism pattern extending in a second direction that intersects with the first direction, wherein the second prism sheet may be disposed under the first prism sheet, and the light absorbing layer may be disposed under the second prism sheet. In addition, the light diffusion layer may be formed under the light absorbing layer.

Figure 4A:
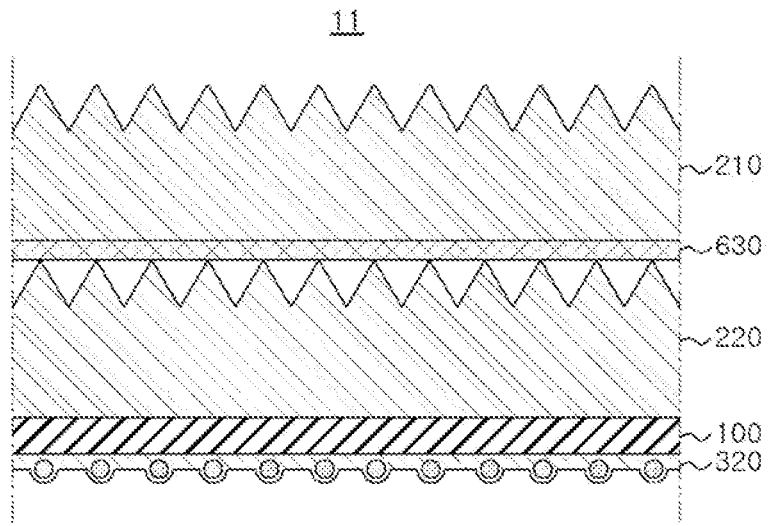
FIGS. 4a to 4c show cross-sectional views of the optical composite sheets of Examples 1 to 3, respectively.

As a specific example, as shown in FIG. 4a, a first prism sheet (210), a second prism sheet (220), a light absorbing layer (100), and a second light diffusion layer (320) may be sequentially laminated in the optical composite sheet (11), and an adhesive layer (630) may be formed between them.

Figure 4B:
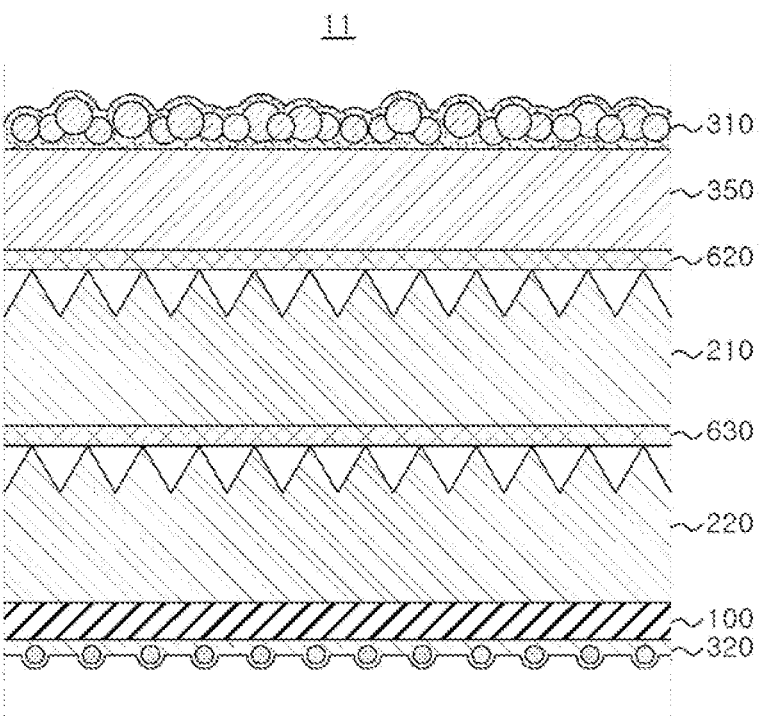

As another specific example, as shown in FIG. 4b, a first light diffusion layer (310), a base film (350), a first prism sheet (210), a second prism sheet (220), a light absorbing layer (100), and a second light diffusion layer (320) may be sequentially laminated in the optical composite sheet (11), and an adhesive layer (620, 630) may be formed between them.

Figure 4C:
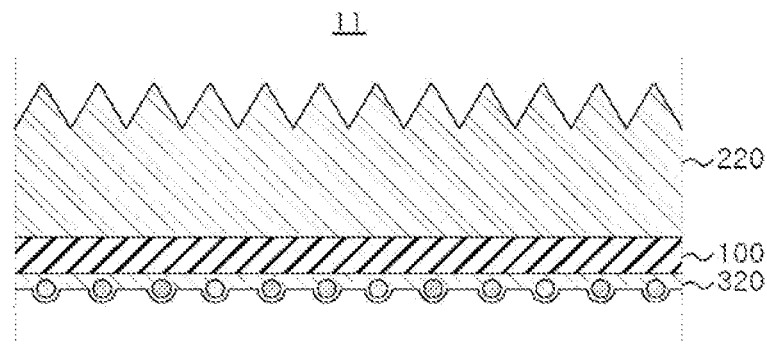

As still another specific example, as shown in FIG. 4c, a first prism sheet or a second prism sheet (220), a light absorbing layer (100), and a second light diffusion layer (320) may be sequentially laminated in the optical composite sheet (11).

Color Gamut

A display device comprising the optical composite sheet according to an embodiment may be enhanced in color gamut as compared with the conventional one.

Color gamut refers to the gamut of color that each medium can reproduce in the entire gamut of light. In general, the evaluation of the color gamut of any medium is carried out by obtaining a triangle consisting of three RGB points in CIE (Commission Internationale de L'eclairage) chromaticity coordinates and comparing it with an RGB triangle of the NTSC (National Television System Committee) or DCI (Digital Cinema Initiatives) standard.

Chromaticity refers to the features of color excluding brightness, and CIE 1976 chromaticity coordinate u'v' is a method that can be expressed closest to the color perceived by humans.

FIG. 1 shows a method of calculating a color gamut from CIE 1976 chromaticity coordinates u'v'. As shown in FIG. 1, a first color gamut (CG1) is drawn as a reference within the entire gamut (CG) of chromaticity coordinates, and a second color gamut (CG2) having the coordinates of red (R), green (G) and blue (B) measured from a sample as vertices is drawn. Then, the area of the overlapping color gamut (CG0) between them is obtained. Thereafter, the color gamut of the sample can be measured by calculating the ratio between the areas of these gamuts.

For example, a triangle of the DCI color gamut (first color gamut) is drawn as a reference in the chromaticity coordinates (CIE 1931 chromaticity coordinates xy or CIE 1976 chromaticity coordinates u'v'), and a triangle of the color gamut (second color gamut) measured from a sample is drawn. Then, the DCI area ratio may be calculated as a percentage (%) of the area of the second color gamut to the area of the first color gamut. In addition, once the overlapping color gamut of the two color gamuts has been obtained, the DCI overlapping ratio may be calculated as a percentage (%) of the area of the overlapping color gamut to the area of the first color gamut.

For example, a display device comprising the optical composite sheet may have a DCI area ratio of 80% or more, specifically, 85% or more, 90% or more, or 95% or more, in the CIE 1931 chromaticity coordinates xy.

In addition, a display device comprising the optical composite sheet may have a DCI overlapping ratio of 80% or more, specifically, 85% or more, 90% or more, or 95% or more, in the CIE 1976 chromaticity coordinates u'v'.

According to an embodiment, a display device comprising the optical composite sheet may have a DCI area ratio of 90% or more in the CIE 1931 chromaticity coordinates xy and a DCI overlapping ratio of 90% or more in the CIE 1976 chromaticity coordinates u'v'.

Spectral Intensity and Color Transmittance of the Optical Composite Sheet

Figure 10A:
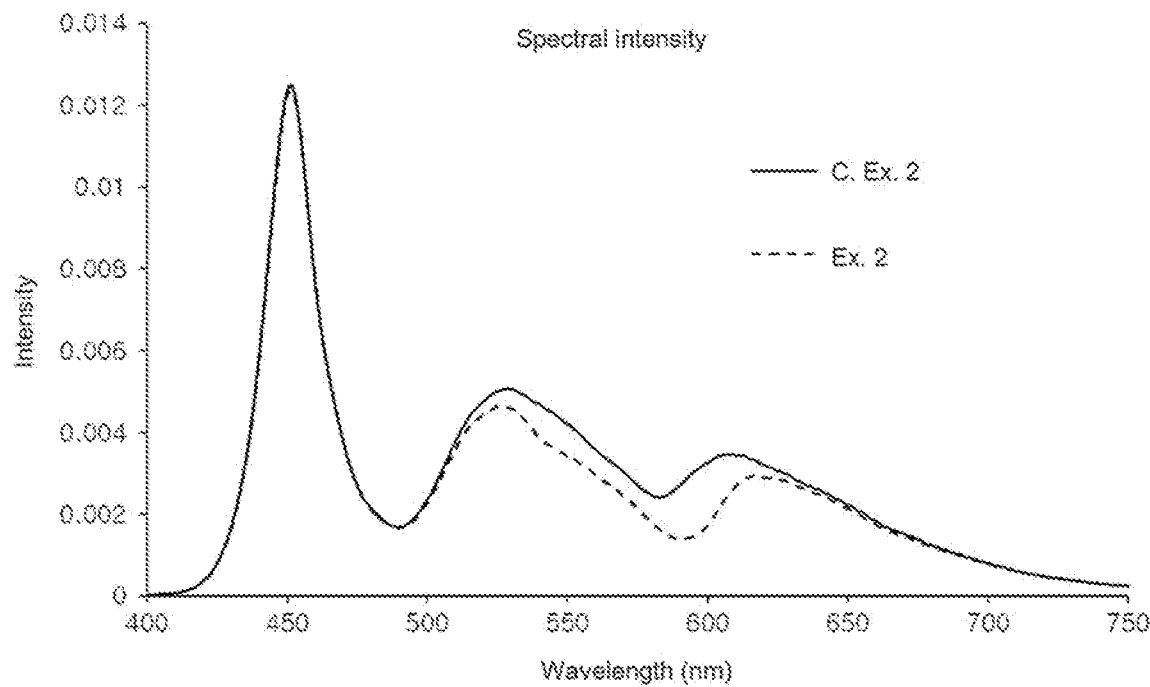
FIG. 10a is a spectral intensity curve of a display device to which an optical composite sheet according to the Examples and Comparative Examples is applied.
Figure 10B:
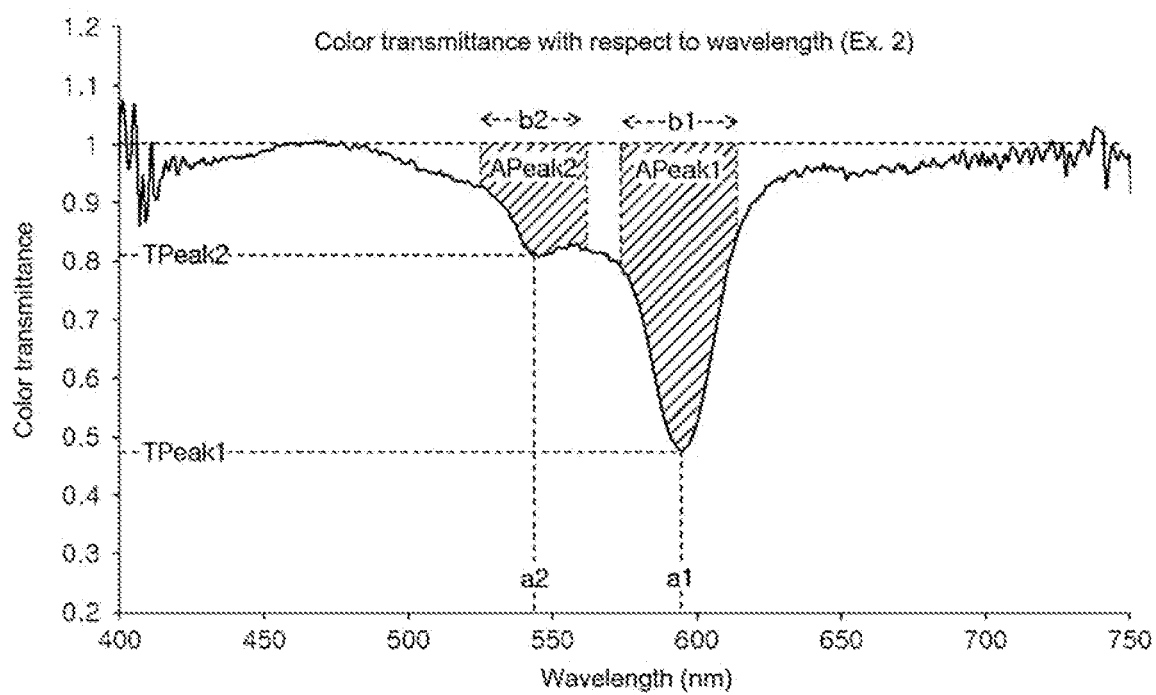
FIG. 10b is a color transmittance curve of an optical composite sheet according to an embodiment.

FIG. 10a shows a spectral intensity curve of a display device to which an optical composite sheet according to an embodiment (Example 2) and a reference sheet (Comparative Example 2) is applied. In addition, FIG. 10b shows a color transmittance curve of an optical composite sheet according to an embodiment (Example 2).

The color transmittance may be obtained through the following procedure. First, the optical composite sheet is disposed on a white surface light source having a continuous emission spectrum, and the spectral intensity (L1) of light emitted through the optical composite sheet (e.g., sheets of FIGS. 4a to 4c) is measured. Thereafter, a reference sheet (e.g., sheets of FIGS. 5a to 5c) is prepared by removing the light absorbing layer from the optical composite sheet, and the reference sheet is disposed on the surface light source. The spectral intensity (L0) of light emitted through the reference sheet is measured in the same manner and at the same position as in L1. The color transmittance is a value (L1/L0) obtained by dividing the spectral intensity (L1) of light emitted through the optical composite sheet by the spectral intensity (L0) of light emitted through the reference sheet.

The light source used for the surface light source may be the light source described above. In addition, the surface light source may comprise a light source and a light guide plate. The optical composite sheet and the reference sheet may be disposed on the upper side of the light guide plate, and the light source may be disposed on a lateral of the light guide plate.

In addition, the surface light source may be obtained from a large LCD TV. As an example, the surface light source may be one obtained by removing a liquid crystal display panel and various optical sheets other than a light guide plate from a large LCD TV. As another example, the surface light source may be one obtained by removing a prism sheet and a reflective polarizing film from the backlight unit of the LCD TV. As still another example, the surface light source may be one obtained by removing the display panel and the optical composite sheet from the display device according to the embodiment.

The color transmittance curve of the optical composite sheet according to the embodiment may have one or more absorption peaks (valley-shaped peaks) within a visible light wavelength. Specifically, the color transmittance curve of the optical composite sheet may have a main absorption peak (peak in the deepest valley shape) at a wavelength other than the pure RGB wavelength. In FIG. 10b, although it has a main absorption peak within 560 nm to 610 nm, it is not limited thereto. Alternatively, it may have a main absorption peak within 480 nm to 510 nm. In addition, the color transmittance curve of the optical composite sheet may further have one or more additional absorption peaks in addition to the main absorption peak. The additional absorption peak may also be present at a wavelength other than the pure RGB wavelength. Alternatively, the color transmittance curve of the optical composite sheet may have an additional absorption peak within the pure RGB wavelength. For example, as shown in FIG. 10b, it may have an additional absorption peak within 525 nm to 565 nm.

In the optical composite sheet, the color transmittance in the absorption wavelength band is adjusted. The absorption wavelength band may be a wavelength range of light selectively absorbed by the light absorbing layer. The absorption wavelength band covers the wavelength of the absorption peak. That is, the absorption wavelength band is a range of wavelengths covering the wavelength of the absorption peak.

As an example, the lower limit of the absorption wavelength band may be less than the wavelength of the absorption peak (that is, the wavelength at the lowest point of the valley) by about 15 nm to about 25 nm. The upper limit of the absorption wavelength band may be greater than the wavelength of the absorption peak by about 15 nm to about 25 nm. As another example, the lower limit of the absorption wavelength band may be less than the wavelength of the absorption peak by about 17 nm to about 23 nm. The upper limit of the absorption wavelength band may be greater than the wavelength of the absorption peak by about 17 nm to about 23 nm. As still another example, the lower limit of the absorption wavelength band may be less than the wavelength of the absorption peak by about 18 nm to about 22 nm. The upper limit of the absorption wavelength band may be greater than the wavelength of the absorption peak by about 18 nm to about 22 nm. As still another example, the lower limit of the absorption wavelength band may be less than the wavelength of the absorption peak by about 19 nm to about 21 nm. The upper limit of the absorption wavelength band may be greater than the wavelength of the absorption peak by about 19 nm to about 21 nm. As still another example, the lower limit of the absorption wavelength band may be less than the wavelength of the absorption peak by about 20 nm. The upper limit of the absorption wavelength band may be greater than the wavelength of the absorption peak by about 20 nm.

The color transmittance may have one absorption peak or two or more absorption peaks. For example, the color transmittance may have two absorption peaks. Specifically, the color transmittance may have a first absorption peak and a second absorption peak. Thus, the color transmittance may have a first absorption wavelength band covering the wavelength of the first absorption peak and a second absorption wavelength band covering the wavelength of the second absorption peak.

The first absorption peak may have a color transmittance lower than that of the second absorption peak. That is, the first absorption peak may be a main absorption peak, and the second absorption peak may be a supplementary absorption peak.

As an example, the wavelength of the first absorption peak may be located in a wavelength band from about 580 nm to about 610 nm, and the wavelength of the second absorption peak may be located in a wavelength band from about 530 nm to about 560 nm. As another example, the wavelength of the first absorption peak may be located in a wavelength band from about 585 nm to about 605 nm, and the wavelength of the second absorption peak may be located in a wavelength band from about 535 nm to about 555 nm. As still another example, the wavelength of the first absorption peak may be located in a wavelength band from about 590 nm to about 600 nm, and the wavelength of the second absorption peak may be located in a wavelength band from about 540 nm to about 550 nm.

As an example, the first absorption wavelength band may be a wavelength band from about 570 nm to about 620 nm, and the second absorption wavelength band may be a wavelength band from about 520 nm to about 570 nm. As another example, the first absorption wavelength band may be a wavelength band from about 575 nm to about 615 nm, and the second absorption wavelength band may be a wavelength band from about 525 nm to about 565 nm. As still another example, the first absorption wavelength band may be a wavelength band from about 580 nm to about 610 nm, and the second absorption wavelength band may be a wavelength band from about 530 nm to about 560 nm. As still another example, the first absorption wavelength band may be a wavelength band from about 582 nm to about 608 nm, and the second absorption wavelength band may be a wavelength band from about 532 nm to about 558 nm.

The ratio of the color transmittance of the first absorption peak to that of the second absorption peak may fall within a specific range.

As shown in FIG. 10b, the color transmittance of the optical composite sheet has a first absorption peak (a1) in a first absorption wavelength band (b1) and a second absorption peak (a2) in a second absorption wavelength band (b2), wherein the ratio (TPeak2/TPeak1) of the color transmittance (TPeak2) of the second absorption peak to the color transmittance (TPeak1) of the first absorption peak may be 1.5 or more. In addition, the first absorption wavelength band may be a wavelength band other than pure RGB, and the second absorption wavelength band may be the RGB wavelength band. If the ratio (TPeak2/TPeak1) of the color transmittance of the absorption peak of the RGB wavelength to the color transmittance of the absorption peak of a wavelength other than pure RGB is 1.5 or more, the color gamut of the display device may be further enhanced.

Specifically, the optical composite sheet may satisfy the following Relationship (1).

$$1.5 \leq TPeak2/TPeak1 \tag{1}$$

In Relationship (1), the first lowest color transmittance (TPeak1) is the lowest color transmittance in a first absorption wavelength band, the second lowest color transmittance (TPeak2) is the lowest color transmittance in a second absorption wavelength band, the first absorption wavelength band is a wavelength band from 575 nm to 615 nm, and the second absorption wavelength band is a wavelength band from 525 nm to 565 nm, wherein a light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance is a value obtained by dividing L1 by L0.

The ratio of TPeak2/TPeak1 may be 1.5 or more, 1.6 or more, 1.7 or more, 2.0 or more, or 3.0 or more. The upper limit of the ratio of TPeak2/TPeak1 is not particularly limited, but it may be, for example, 10.0 or less, 5.0 or less, or 3.0 or less. Specifically, the ratio of TPeak2/TPeak1 may be 1.5 to 5.0, 1.5 to 3.0, or 1.5 to 2.0.

In addition, the ratio of the area of the first absorption peak to that of the second absorption peak may fall within a specific range.

As shown in FIG. 10b, in the graph of color transmittance of the optical composite sheet with respect to wavelength, based on an imaginary line having an intensity of 1, the ratio (APeak1/APeak2) of the peak area (APeak1) within ±20 nm of the first absorption peak wavelength to the peak area (APeak2) within ±20 nm of the second absorption peak wavelength may be 2.0 or more. If the ratio (APeak1/APeak2) of the area of the absorption peak of the RGB wavelength to the area of the absorption peak of a wavelength other than pure RGB is 2.0 or more, the color gamut of the display device may be further enhanced.

Specifically, the optical composite sheet may further satisfy the following Relationship (2):

$$2.0 \leq APeak1/APeak2 \quad (2)$$

In Relationship (2), the area (APeak1) of the first absorption peak is a value obtained by subtracting the color transmittance in the first absorption wavelength band from 1 and integrating it. The area (APeak2) of the second absorption peak is a value obtained by subtracting the color transmittance in the second absorption wavelength band from 1 and integrating it.

The ratio of APeak1/APeak2 may be 2.0 or more, 2.1 or more, 2.2 or more, 2.3 or more, 2.5 or more, 3.0 or more, or 5.0 or more. The upper limit of the ratio of APeak1/APeak2 is not particularly limited, but it may be, for example, 10.0 or less, 5.0 or less, or 3.0 or less. Specifically, the ratio of APeak1/APeak2 may be 2.0 to 5.0, 2.0 to 4.0, or 2.0 to 3.0.

In the optical composite sheet according to the embodiment, optical functional elements such as a prism sheet and a light diffusion layer are combined, and a light absorbing layer that selectively absorbs light of a specific wavelength band is inserted, so that the optical performance and color gamut can be enhanced as compared with the prior art. In particular, the color transmittance of the optical composite sheet with respect to wavelength measured for each viewing angle satisfies a specific relationship, whereby it is possible to effectively reduce a color deviation with respect to a viewing angle.

Accordingly, the optical composite sheet according to an embodiment may be applied to a backlight unit of a display device such as an LCD to enhance its performance.

MODE FOR THE INVENTION

Hereinafter, the embodiments are explained in more detail by the following examples. However, the scope of the present invention is not limited thereto only.

Preparation Example of Optical Composite Sheets

Example 1

(A) In order to prepare a composition for a light absorbing layer, 0.05 part by weight of a light absorber (PANAX NEC 584, Ukseung Chemical) and 1.0 part by weight of a UV blocking agent (TINUVIN™ 928, BASF) were added to 100 parts by weight of a solution in which an acrylic binder resin (AOF-2914, Aekyung) and propylene glycol methyl ether (PGME) had been mixed at a weight ratio of 30:70.

(B) A UV-curable resin was coated on one side of a base film (PET) having a thickness of 100 μm to form a prism pattern in a thickness of about 40 μm, thereby preparing a lower prism sheet. The composition for a light absorbing layer was coated on the other side of the base film using a Mayer bar, which was dried and cured to form a light absorbing layer having a thickness of 3 μm. A composition was prepared in which 15 parts by weight of polybutyl methacrylate (PBMA) beads, 35 parts by weight of a urethane acrylate resin, and 50 parts by weight of methyl ethyl ketone (MEK) as a solvent were mixed. It was coated on the surface of the light absorbing layer and dried to form a lower light diffusion layer having a thickness of 5 μm.

(C) A UV-curable resin was coated on one side of a base film (PET) having a thickness of 100 μm to form a prism pattern in a thickness of about 40 μm, thereby preparing an upper prism sheet. A UV-curable adhesive resin was coated on the other side of the base film using a Mayer bar to a thickness of 0.5 to 1.0 μm. It adhered to the surface of the lower prism sheet previously prepared and UV cured to obtain a composite sheet (see FIG. 4a).

Example 2

Steps (A) to (C) of Example 1 were repeated to obtain a composite sheet.

(D) A composition was prepared in which 15 parts by weight of polymethyl methacrylate (PMMA) beads, 35 parts by weight of an acryl binder resin, and 50 parts by weight of methyl ethyl ketone (MEK) as a solvent were mixed. This composition was coated on one side of a base film (PET) having a thickness of 100 μm and dried to form an upper light diffusion layer having a thickness of 15 μm. A UV-curable adhesive resin was coated on the other side of the base film using a Mayer bar to a thickness of 0.5 to 1.0 μm. It adhered to the upper prism pattern of the composite sheet previously prepared and UV cured to obtain a final composite sheet (see FIG. 4b).

Example 3

Steps (A) and (B) of Example 1 were repeated to obtain a composite sheet in which a light absorbing layer and a lower diffusion layer were formed on one side of the base film of the lower prism sheet (see FIG. 4c).

Comparative Example 1

Figure 5A:
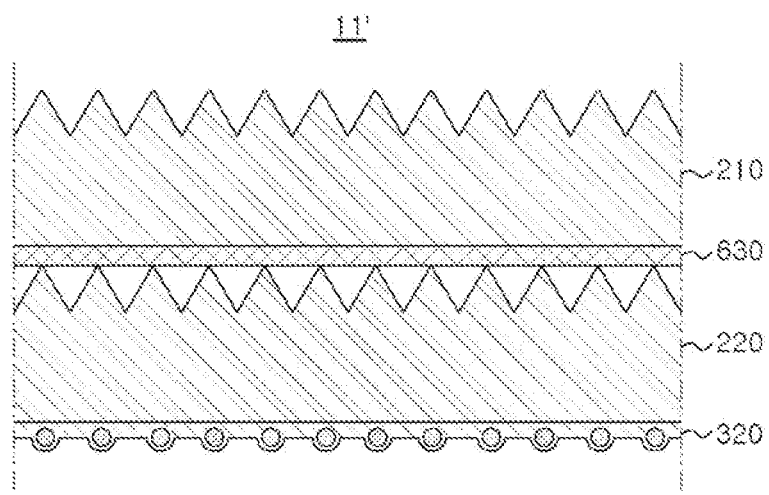
FIGS. 5a to 5c show cross-sectional views of the optical composite sheets of Comparative Examples 1 to 3, respectively.

The procedures of Steps (A) to (C) of Example 1 were repeated to obtain a composite sheet, provided that a light absorbing layer was not formed on the other side of the base film of the lower prism sheet in step (B) and that the subsequent procedures were carried out (see FIG. 5a).

Comparative Example 2

Figure 5B:
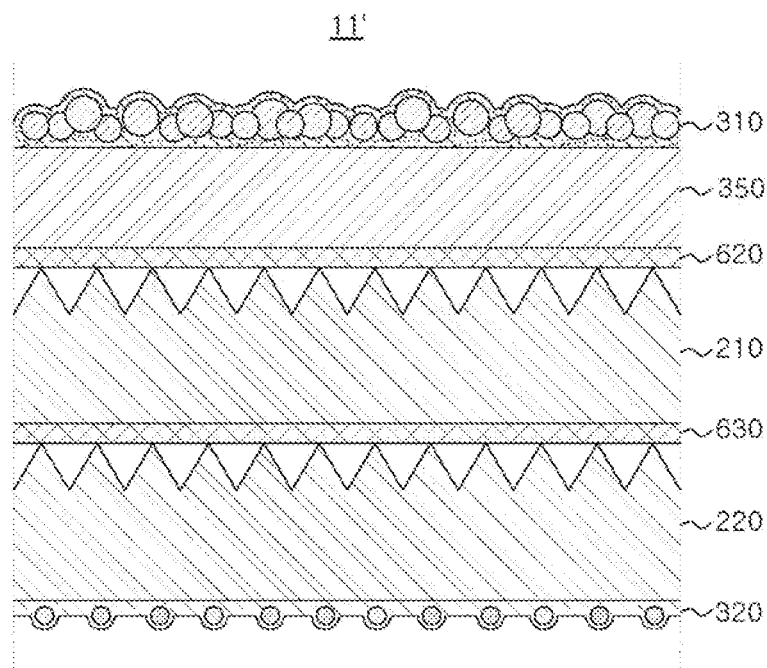

The procedures of Steps (A) to (D) of Example 2 were repeated to obtain a composite sheet, provided that a light absorbing layer was not formed on the other side of the base film of the lower prism sheet in step (B) and that the subsequent procedures were carried out (see FIG. 5b).

Comparative Example 3

Figure 5C:
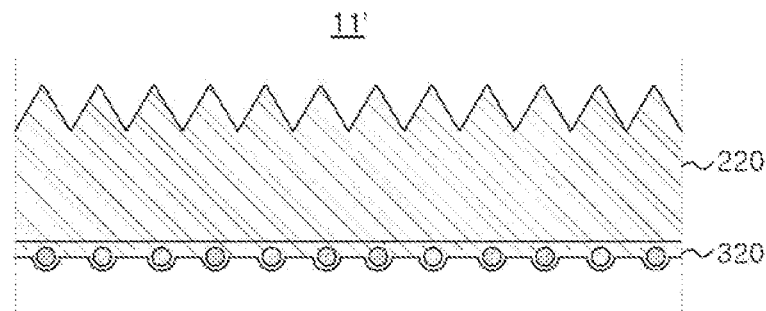

The procedures of Steps (A) and (B) of Example 3 were repeated to obtain a composite sheet, provided that a light absorbing layer was not formed on the other side of the base film of the lower prism sheet in step (B) and that the subsequent procedures were carried out (see FIG. 5c).

Application Example to a Display Device

In a liquid crystal display device (55-inch LED direct type, 220 V, LG Electronics), the optical films (reflective polarizing film, prism sheet, and the like) located on the rear side of the liquid crystal display panel were removed, and the optical composite sheet instead was placed there.

Measurement Example of Color Gamut

The optical composite sheet was applied to a display device. A spectroradiometer (SR-3, TOPCON, working distance: 660 mm, field spec.: 0.2 D) was used to measure CIE 1931 chromaticity coordinates xy, from which the area of color gamut and DCI overlapping ratio were calculated. The results are shown in the table below.

Light Transmittance of a Light Absorbing Layer

The procedures of Step (a) of Example 1 were repeated to prepare a composition for a light absorbing layer, which was coated on one side of a PET film having a thickness of 100 μm, dried, and cured to form a light absorbing layer having a thickness of 3 μm. The light transmittance for a wavelength of 590 nm was measured using a spectrophotometer. The results are shown in the table below.

Examples 1 to 3 had been applied had an excellent DCI overlapping ratio of 90% or more.

Measurement Example of Spectral Intensity and Color Transmittance

The optical composite sheet of Example 2 was disposed on a surface light source using white LEDs (GaN, YAG) having a continuous emission spectrum. The spectral intensity of light emitted through the optical composite sheet was measured. In addition, the spectral intensity was also measured for the optical composite sheet of Comparative Example 2 under the same conditions. FIG. 10a shows a spectral intensity of the liquid crystal display devices to which the optical composite sheet of Example 2 and the optical composite sheet of Comparative Example 2 were applied, respectively.

Thereafter, the spectral intensity (L1) of the optical composite sheet of Example 2 was divided by the spectral intensity (L0) of the optical composite sheet of Comparative Example 2 to produce a color transmittance (L1/L0). FIG. 10b shows a color transmittance of the optical composite sheet of Example 2.

As can be seen from FIG. 10b, the color transmittance of the optical composite sheet of Example 2 had a first absorption peak (a1) (about 595 nm) in a wavelength band (b1) (about 575 to 615 nm) other than pure RGB and a second absorption peak (a2) (about 545 nm) in the RGB wavelength band (b2) (about 525 to 565 nm). The color transmittance (TPeak1) of the first absorption peak, the color transmittance (TPeak2) of the second absorption peak, and the ratio (TPeak2/TPeak1) therebetween were calculated and summarized in Table 2 below.

TABLE 1

| | | | C. Ex. 1 | Ex. 1 | C. Ex. 2 | Ex. 2 | C. Ex. 3 | Ex. 3 |
|---|---|---|---|---|---|---|---|---|
| Luminance (cd/m²) | White | Lv | 275.5 | 240.3 | 270.6 | 219.9 | 271 | 256.8 |
| | Red | Lv | 50.9 | 40.1 | 49.3 | 36.4 | 49.8 | 43 |
| | Green | Lv | 195.5 | 171.4 | 192.3 | 158.1 | 192.5 | 183.5 |
| | Blue | Lv | 28.2 | 28 | 28 | 26.1 | 27.8 | 29.4 |
| CIE 1931 Color coordinates xy | White | x | 0.2818 | 0.262 | 0.279 | 0.2596 | 0.2807 | 0.2637 |
| | | y | 0.2873 | 0.268 | 0.2842 | 0.2649 | 0.2859 | 0.2701 |
| | Red | x | 0.6602 | 0.6672 | 0.6601 | 0.6687 | 0.6597 | 0.6677 |
| | | y | 0.3331 | 0.3245 | 0.3329 | 0.3227 | 0.3331 | 0.324 |
| | Green | x | 0.3051 | 0.2856 | 0.3037 | 0.283 | 0.3048 | 0.2864 |
| | | y | 0.6206 | 0.6281 | 0.6213 | 0.6295 | 0.6209 | 0.6289 |
| | Blue | x | 0.1491 | 0.1489 | 0.1492 | 0.1488 | 0.1492 | 0.149 |
| | | y | 0.0584 | 0.0568 | 0.0577 | 0.0565 | 0.0579 | 0.0567 |
| | Area | | 0.0646236 | 0.0713247 | 0.0650774 | 0.0726391 | 0.0647444 | 0.0716407 |
| | DCI area ratio | | 81.60% | 90.10% | 82.20% | 91.70% | 81.80% | 90.50% |
| CIE 1976 Color coordinates u'v' | W | u' | 0.192 | 0.184 | 0.191 | 0.183 | 0.191 | 0.185 |
| | | v' | 0.439 | 0.424 | 0.437 | 0.421 | 0.438 | 0.425 |
| | R | u' | 0.465 | 0.48 | 0.465 | 0.483 | 0.465 | 0.481 |
| | | v' | 0.528 | 0.525 | 0.528 | 0.525 | 0.528 | 0.525 |
| | G | u' | 0.124 | 0.115 | 0.123 | 0.113 | 0.124 | 0.115 |
| | | v' | 0.568 | 0.567 | 0.568 | 0.567 | 0.568 | 0.567 |
| | B | u' | 0.175 | 0.176 | 0.176 | 0.176 | 0.176 | 0.176 |
| | | v' | 0.154 | 0.151 | 0.153 | 0.15 | 0.153 | 0.151 |
| | DCI overlapping area | | 0.0695 | 0.0742 | 0.0698 | 0.0753 | 0.0696 | 0.0744 |
| | DCI overlapping area | | 85.40% | 91.20% | 85.70% | 92.50% | 85.50% | 91.40% |
| Light transmittance of a light absorbing layer | | | — | 72.00% | — | 72.00% | — | 62.00% |

As can be seen from the above table, the display devices to which the optical composite sheets according to Comparative Examples 1 to 3 had been applied had a low DCI overlapping ratio of less than 90%. Thus, the color reproducibility was evaluated to be low. In contrast, the display devices to which the optical composite sheets according to In addition, in the graph of color transmittance of the optical composite sheet with respect to wavelength, based on an imaginary line having an intensity of 1, the peak area (APeak1) within ±20 nm of the first absorption peak wavelength and the peak area (APeak2) within ±20 nm of the second absorption peak wavelength were calculated by integration and shown in Table 3 below.

TABLE 2

| | Color transmittance | | |
| --- | --- | --- | --- |
| | TPeak2 | TPeak1 | TPeak2/TPeak1 |
| Ex. 2 | 0.81 | 0.47 | 1.72 |

TABLE 3

| | Peak area | | |
| --- | --- | --- | --- |
| | APeak1 | APeak2 | APeak1/APeak2 |
| Ex. 2 | 14.76 | 6.29 | 2.35 |

As can be seen from the above tables, the optical composite sheet of Example 2 had a ratio (TPeak2/TPeak1) of the color transmittance of the absorption peak of the RGB wavelength to the color transmittance of the absorption peak of a wavelength other than pure RGB, which is a high value of 1.5 or more. Thus, the color gamut of the display device may be further enhanced. In addition, the optical composite sheet of Example 2 had a ratio (APeak1/APeak2) of the area of the absorption peak of the RGB wavelength to the area of the absorption peak of a wavelength other than pure RGB, which is a high value of 2.0 or more. Thus, the color gamut of the display device may be further enhanced.

The invention claimed is:

1. A display device, which comprises:
a light source;
a display panel that receives light incident from the light source and displays an image; and
an optical composite sheet disposed in an optical path from the light source to the display panel,
wherein the optical composite sheet comprises a prism sheet disposed in the optical path; a light diffusion layer disposed in the optical path; and a light absorbing layer disposed in the optical path and selectively absorbing light of a specific wavelength band among the light from the light source,
wherein DCI (Digital Cinema Initiatives) area ratio in CIE 1931 chromaticity coordinates xy and DCI overlapping ratio in CIE 1976 chromaticity coordinates u'v' are both 90% or more,
wherein the light absorbing layer is disposed closer to the light source than the prism sheet based on the optical path,
wherein the prism sheet, the light diffusion layer, and the light absorbing layer are combined with each other,
wherein the light absorbing layer is disposed closer to the light source than the prism sheet based on the optical path, and
wherein the light diffusion layer is disposed closer to the light source than the light absorbing layer based on the optical path.

2. The display device of claim 1, wherein the prism sheet comprises a first prism sheet comprising a first prism pattern extending in a first direction; and a second prism sheet comprising a second prism pattern extending in a second direction that intersects with the first direction, the second prism sheet is disposed under the first prism sheet,
the optical composite sheet further comprises a cushioning film disposed on the first prism sheet; a reflective polarizing film disposed on the cushioning film; and an additional light diffusion layer disposed on the reflective polarizing film,
wherein the reflective polarizing film comprises a laminate of two or more thin films having different optical properties from each other, and the cushioning film comprises a polyester resin.

3. The display device of claim 1, wherein the light absorbing layer has a main absorption wavelength at 580 nm to 620 nm and a supplementary absorption wavelength at 530 nm to 570 nm.

4. The display device of claim 1, wherein the light absorbing layer further comprises a UV blocking agent.

5. The display device of claim 1, wherein the prism sheet comprises a base layer and a pattern layer formed on one side of the base layer, the light absorbing layer is disposed on an other side of the base layer, and the light diffusion layer is disposed on a surface of the light absorbing layer.

6. The display device of claim 1, which satisfies the following Relationship (1): 1.5<=TPeak2/TPeak1 ... (1) in Relationship (1), TPeak1, a first lowest color transmittance, is a lowest value of color transmittance values over a first absorption wavelength band, wherein the first absorption wavelength band is a wavelength band from 575 nm to 615 nm, and TPeak2, a second lowest color transmittance, is a lowest value of color transmittance values over a second absorption wavelength band, wherein the second absorption wavelength band is a wavelength band from 525 nm to 565 nm, wherein the first lowest and second lowest color transmittance values are obtained by dividing L1 by L0, wherein L1 is a spectral intensity measured for light passed through the optical composite sheet, in which the light is white light with a continuous emission spectrum, emitted from the light source; and wherein the L0 is a spectral intensity measured under a same condition for measuring except that the optical composite sheet is a reference optical composite sheet that is free of the light absorbing layer.

7. The display device of claim 6, which further satisfies the following Relationship (2): 2.0≤APeak1/APeak2 ... (2) in Relationship (2), APeak1, an area of a first absorption peak, is a sum of values obtained by subtracting the color transmittance values over the first absorption wavelength band from an integer 1, and APeak2, an area of a second absorption peak, is a sum of values value obtained by subtracting the color transmittance values over the second absorption wavelength band from an integer 1.

8. An optical composite sheet, which comprises: a prism sheet; a light diffusion layer disposed under the prism sheet; and a light absorbing layer disposed on or under the prism sheet and selectively absorbing light of a specific wavelength band, wherein the optical composite sheet satisfies the following Relationship (1): 1.5<=TPeak2/TPeak1 ... (1) in Relationship (1), TPeak1, a first lowest color transmittance, is a lowest value of color transmittance values over a first absorption wavelength band, wherein the first absorption wavelength band is a wavelength band from 575 nm to 615 nm, and TPeak2, a second lowest color transmittance, is a lowest value of color transmittance values over a second absorption wavelength band, wherein the second absorption wavelength band is a wavelength band from 525 nm to 565 nm, wherein the first and second lowest color transmittance values are obtained by dividing L1 by L0, wherein the L1 is a spectral intensity measured for light passed through the optical composite sheet, in which the light is white light with a continuous emission spectrum, emitted from the light source; and wherein the L0 is a spectral intensity measured under a same condition for measuring L1 except that the optical composite sheet is a reference optical composite sheet that is free of the light absorbing layer.

9. The optical composite sheet of claim 8, which further satisfies the following Relationship (2): $2.0 \leq APeak1/APeak2$ ... (2) in Relationship (2), APeak1, an area of a first absorption peak, is a sum of values obtained by subtracting the color transmittance values over of the first absorption wavelength band from an integer 1, and APeak2, an area of a second absorption peak, is a sum of values obtained by subtracting the color transmittance values over the second absorption wavelength band from an integer 1.

* * * * *